US011648992B2

(12) United States Patent
Cunningham

(10) Patent No.: US 11,648,992 B2
(45) Date of Patent: May 16, 2023

(54) VEHICLE TAILGATE CARGO STABILIZER

(71) Applicant: Toyota Motor Engineering & Manufacturing North America, Inc., Plano, TX (US)

(72) Inventor: James Dennis Cunningham, Clarkston, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 148 days.

(21) Appl. No.: 17/208,931

(22) Filed: Mar. 22, 2021

(65) Prior Publication Data
US 2022/0297770 A1 Sep. 22, 2022

(51) Int. Cl.
B62D 33/027 (2006.01)

(52) U.S. Cl.
CPC .................. B62D 33/027 (2013.01)

(58) Field of Classification Search
CPC ............ B62D 33/023; B62D 33/0273; B62D 33/2076; B62D 33/027; B62D 33/03
USPC .................................. 296/50, 57.1
See application file for complete search history.

(56) References Cited

U.S. PATENT DOCUMENTS

| 5,197,642 | A | 3/1993 | Cortelli |
| 5,433,566 | A | 7/1995 | Bradley |
| 6,210,087 | B1 | 4/2001 | Bacon |
| 6,626,620 | B1 | 9/2003 | Veal |
| 7,044,699 | B1 | 5/2006 | St. Denis |
| 7,156,592 | B1 | 1/2007 | Cava |
| 7,513,726 | B1 | 4/2009 | Comiskey, Jr. |
| 7,798,752 | B2 | 9/2010 | Harrison |
| 8,858,139 | B2 | 10/2014 | Prottengeier et al. |
| 9,862,660 | B2 | 1/2018 | Fukushima et al. |
| 10,336,378 | B2 | 7/2019 | Marchlewski et al. |
| 10,703,303 | B2 | 7/2020 | Hemphill et al. |
| 2007/0236038 | A1* | 10/2007 | Firzlaff .............. B62D 33/0273 296/57.1 |
| 2008/0173684 | A1 | 7/2008 | Kyasky |
| 2013/0300143 | A1 | 11/2013 | Dunn |
| 2019/0249479 | A1* | 8/2019 | Lewis ...................... E05B 47/00 |
| 2020/0017018 | A1* | 1/2020 | Estey ......................... B60P 7/15 |
| 2020/0198545 | A1* | 6/2020 | Townson .................. B60R 7/02 |
| 2021/0025202 | A1* | 1/2021 | Norris .................. B62D 33/027 |
| 2021/0163082 | A1* | 6/2021 | Borkar ...................... B60R 3/02 |

FOREIGN PATENT DOCUMENTS

CA 2418606 8/2004

* cited by examiner

Primary Examiner — Joseph D. Pape
Assistant Examiner — Veronica M Shull
(74) Attorney, Agent, or Firm — Snell & Wilmer LLP

(57) ABSTRACT

A vehicle tailgate configured to secure cargo and methods of using the same. The vehicle tailgate tray have a base portion. The base portion may have a top surface and be attachable to the vehicle. The vehicle tailgate may further have a top portion. The top portion may have a bottom surface and be attachable to the base portion. The top surface and the bottom surface may face each other and be configured to receive and fix the cargo when the top portion and the base portion are attached together. The bottom surface may be configured to adapt to a shape of the cargo.

17 Claims, 5 Drawing Sheets

VEHICLE TAILGATE CARGO STABILIZER

BACKGROUND

1. Field

The various aspects and embodiments described herein relate to apparatus and methods for stabilizing cargo carried by a vehicle via a tailgate of the vehicle.

2. Description of the Related Art

Vehicles such as pick-up trucks, sport utility vehicles (SUVs), utility terrain vehicles (UTVs), minivans, station wagons, and the like have beds and trunks suitable to hold and transport long cargo (e.g., wood slabs, logs, glass panels, furniture, piping, moulding, etc.). However, such long cargo often extends over the tailgate of a vehicle and requires the use of straps and tie-downs. Fastening cargo with straps, tie-downs, and/or the like may be time consuming and they may come undone if not set up properly. As a result, the cargo may be rattling, damaged, and/or a safety hazard if not set up properly. Further, using straps, tie-downs, and/or the like requires such to be stored when not in use, taking up space, and risking forgetting or losing them. Thus, there is a need for a vehicle tailgate cargo stabilizer.

SUMMARY

A vehicle tailgate configured to secure cargo and methods of using the same are disclosed herein. The vehicle tailgate may have a base portion and a top portion. The vehicle tailgate may be attachable to the vehicle from the base portion, and the top portion may be attachable to the base portion. The top portion and the base portion may be configured to receive and fix the cargo when attached together. The bottom surface may be configured to adapt to a shape of the cargo. The top portion may have a plurality of fingers that can slide vertically to conform to the shape of the cargo and be locked into place.

In accordance with an embodiment of the present disclosure, there may be a vehicle tailgate configured to secure cargo. The vehicle tailgate may include a base portion. The base portion may have a top surface. The base portion may be attachable to the vehicle. The vehicle tailgate may include a top portion. The top portion may have a bottom surface. The top portion may be attachable to the base portion. The top surface and the bottom surface may face each other and be configured to receive and fix the cargo when the top portion and the base portion are attached together.

The bottom surface of the top portion may be configured to adapt to a shape of the cargo. The top portion may be constructed similarly to a contour gauge, a commonly used tool in the construction industry. The top portion may have a plurality of fingers. The vehicle tailgate may further include a first lock configured to compress the plurality of fingers to lock the plurality of fingers in place.

The top portion may be configured to be attached to the base portion by inserting one or more alignment rods extending from the bottom surface into one or more holes on the top surface of the bottom portion. The vehicle tailgate may further include a second lock configured to lock the top portion relative to the base portion. The top portion may have left and right outer side surfaces. The base portion may have a left and right inner side surfaces. The left and right outer side surfaces may face the left and right inner side surfaces when the top portion is attached to the base portion.

In accordance with an embodiment of the present disclosure, there may be a vehicle configured to transport cargo in a secured state. The vehicle may include a tailgate. The tailgate may include a base portion. The base portion may have a top surface. The base portion may be attachable to the vehicle. The tailgate may include a top portion. The top portion may have a bottom surface. The top portion may be attachable to the base portion. The top surface and the bottom surface may face each other and be configured to receive and secure the cargo when the top portion and the base portion are attached together.

The bottom surface may be configured to adapt to a shape of the cargo. The top portion may function like a contour gauge. The top portion may have a plurality of fingers. The tailgate may further include a first lock configured to compress the plurality of fingers to lock the plurality of fingers in place.

The top portion may be configured to be attached to the base portion by inserting one or more alignment rods extending from the bottom surface into one or more holes on the top surface. The tailgate may further include a second lock configured to lock the top portion relative to the base portion. The top portion may have left and right outer side surfaces. The base portion may have left and right inner side surfaces. The left and right outer surfaces may face the left and right inner side surfaces when the top portion is attached to the base portion.

In accordance with an embodiment of the present disclosure, there may be a method for securing cargo onto a vehicle. The method may include resting the cargo onto a top surface of a base portion of a tailgate of the vehicle. The method may further include attaching a top portion of the tailgate to the base portion over the cargo such that a bottom surface of the top portion and the top surface hold the cargo in place.

The bottom surface may be configured to adapt to a shape of the cargo. The top portion may function like a contour gauge. The method may further include locking, by a first lock, a plurality of fingers of the top portion in place to prevent movement of the plurality of fingers when the vehicle is in motion.

The top portion may be attached to the base portion by inserting one or more alignment rods extending from the bottom surface into one or more holes on the top surface. The method may further include locking, by a second lock, the top portion relative to the base portion to further prevent movement of the cargo.

BRIEF DESCRIPTION OF THE DRAWINGS

Other apparatus, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The apparatus and methods described herein enable users (e.g., drivers and/or passengers (interchangeable when referring to autonomous or semi-autonomous vehicles)) to secure their cargo via their vehicle tailgate. The vehicle tailgate may have a base portion, or a bottom portion, and a top portion. The vehicle tailgate may be attachable to the vehicle from the base portion, and the top portion may be attachable to the base portion. The top portion and the base portion may be configured to advantageously receive and fix the cargo in between when attached together. The bottom surface may be configured to advantageously adapt to a shape of the cargo. The top portion may have a plurality of fingers that can advantageously slide vertically to conform to the shape of the cargo and be locked into place to prevent the fingers from moving up and down during transport.

Figure 1:
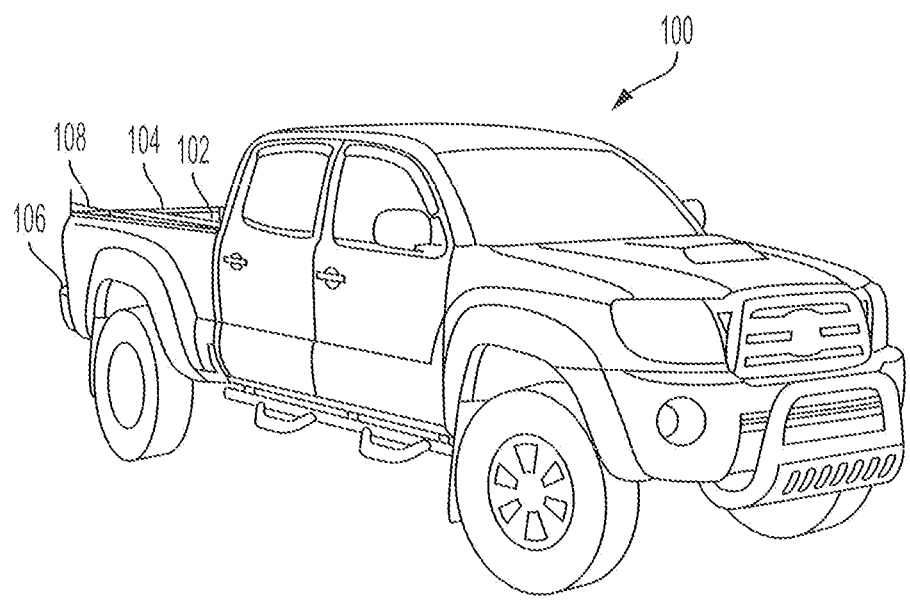
FIG. 1 illustrates a perspective view of a vehicle according to an aspect of the present disclosure.

FIG. 1 illustrates a perspective view of a vehicle 100 according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a pick-up truck, an SUV, a UTV, a minivan, a stain wagon, or another other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1 depicts a pick-up truck by example. The vehicle 100 may be an autonomous or semi-autonomous vehicle having self-driving capabilities. The vehicle 100 may have a truck bed 102 enclosed by a tailgate 104 from a rear end 106. The truck bed 102 may have an open top or a closed top. The truck bed 102 may be suitable to store and transport cargo. The truck bed 102 may accommodate cargo that has a length longer than a length 108 of the truck bed 102. For instance, the cargo may extend out from the tailgate 104. In some embodiments, the tailgate 104 may enclose a trunk.

Figure 2:
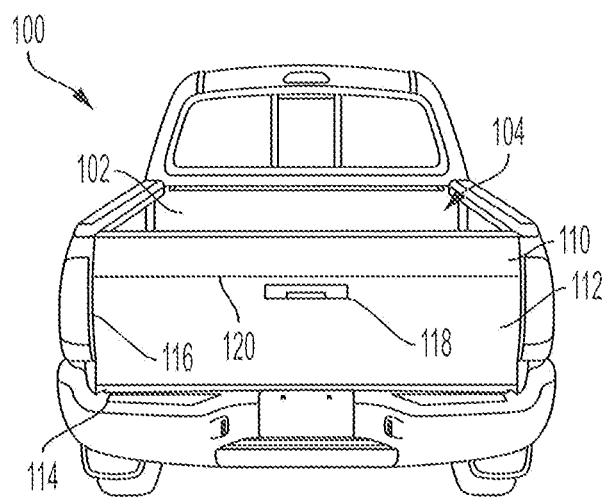
FIG. 2 illustrates a rear view of the vehicle of FIG. 1 showing a cargo stabilizing tailgate according to an aspect of the present disclosure.

FIG. 2 illustrates a rear view of the vehicle 100 showing a cargo stabilizing tailgate 104 according to an aspect of the present disclosure. The tailgate 104 may have a top portion 110 and a bottom portion 112. The top portion 110 and the bottom portion 112 may be attachable together and structurally complement each other. The bottom portion 112 may be directly and/or moveably attachable to the truck bed 102. The attachment may be a hinge attachment. The hinge attachment may be at a bottom 114 or a side 116 of the truck bed 102. The bottom portion 112 may have a handle 118 that unlocks the bottom portion 112. The unlocking may enable pivoting of the hinge attachment to open and close the bottom portion 112 to access and restrict access to the truck bed 102, respectively. In some embodiments, the top portion 110 may be directly attachable to the truck bed 102. The attachment may be a hinge attachment. The hinge attachment may be at a side 116 of the truck bed 102. The top portion 110 may have a handle 118 that unlocks the top portion 110. The unlocking may enable pivoting of the hinge attachment to open and close the top portion 110 to access and restrict access to the truck bed 102, respectively.

The tailgate 104 may be manufactured from metal, glass, plastic, and/or wood. The top portion 110 and the bottom portion 112 may be constructed separately. The top portion 110 and the bottom portion 112 may be cut from the same slab of material to achieve fitment between the two pieces once separated. Once attached together, a seam 120 of the top portion 110 and the bottom portion 112 may be horizontally straight. In some embodiments, the seam 120 may have a curvature. In some embodiments, the seam 120 may have straight teeth or an irregular shape.

Figure 3A:
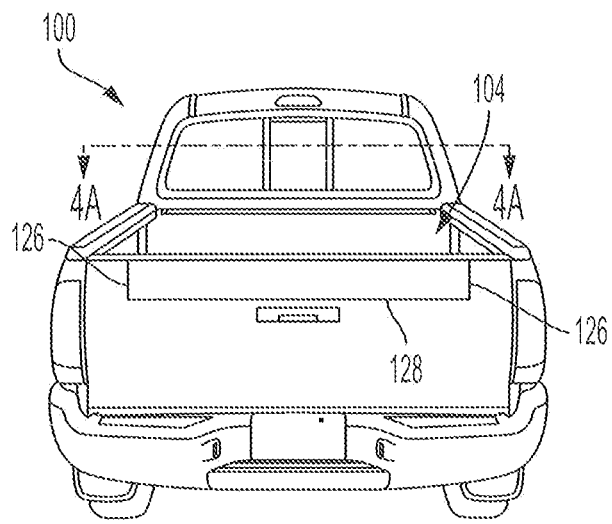
FIG. 3A illustrates a rear view of the vehicle of FIG. 1 showing a cargo stabilizing tailgate according to an aspect of the present disclosure.

FIG. 3A illustrates a rear view of the vehicle 100 showing a cargo stabilizing tailgate 104 according to an aspect of the present disclosure. The tailgate 104 may have the same specifications of the tailgate of FIG. 2 except the top portion 110 may be embedded in, flush with or slide partially into the bottom portion 112. Said differently, the bottom portion 112 may encapsulate sides 126 and a bottom 128 of the top portion 110.

Figure 3B:
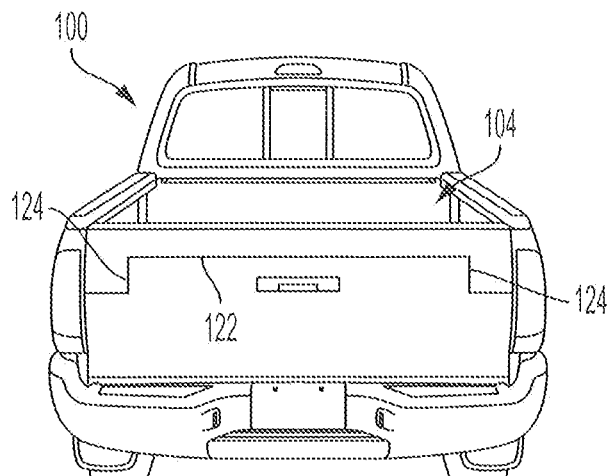
FIG. 3B illustrates a rear view of the vehicle of FIG. 1 showing a cargo stabilizing tailgate according to an aspect of the present disclosure.

FIG. 3B illustrates a rear view of the vehicle 100 showing a cargo stabilizing tailgate 104 according to an aspect of the present disclosure. The tailgate 104 may have the same specifications of the tailgate of FIG. 3A except the arrangement of the top portion 110 and the bottom portion 112 may be the inverse of that of FIG. 3A. Said differently, the top portion 110 may completely encapsulate a top 122 and partially encapsulate sides 124 of the bottom portion 112.

Figure 4A:
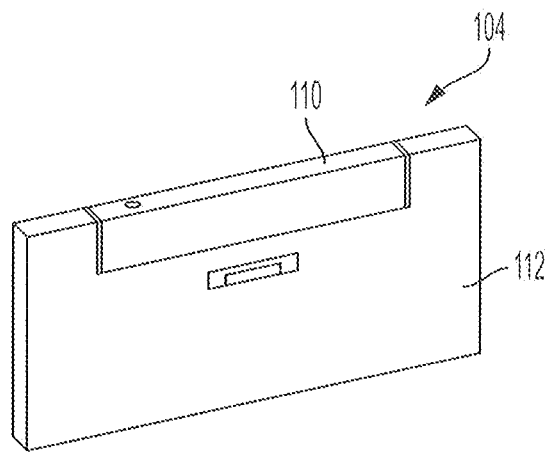
FIG. 4A illustrates an isolated view of the cargo stabilizing tailgate of FIG. 3A according to an aspect of the present disclosure.

FIG. 4A illustrates an isolated view of the cargo stabilizing tailgate 104 according to an aspect of the present disclosure. In FIG. 4A, the top portion 110 and the bottom portion 112 are attached together with no cargo in between. The top portion 110 may be embedded in, flush with or slide partially into the bottom portion 112. When there is no cargo in between the top portion 110 and the bottom portion 112, the tailgate 104 may function like a conventional tailgate. In some embodiments, the tailgate 104 may be a trunk lid and function like a conventional trunk lid.

Figure 4B:
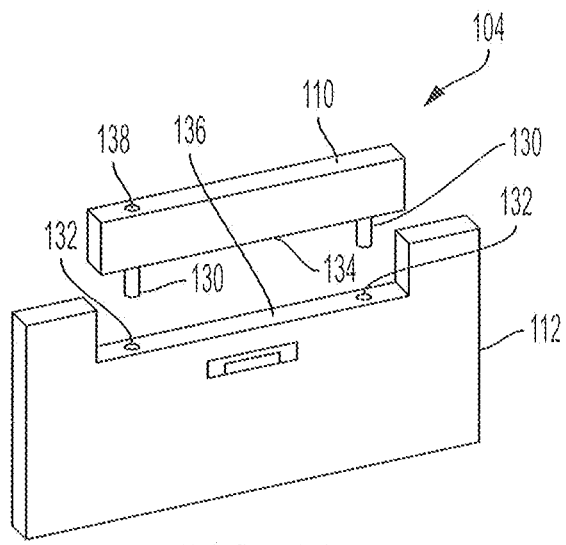
FIG. 4B illustrates an isolated view of the cargo stabilizing tailgate of FIG. 3A showing a removable top portion according to an aspect of the present disclosure.

FIG. 4B illustrates an isolated view of the cargo stabilizing tailgate 104 showing a removable top portion 110 according to an aspect of the present disclosure. The top portion 110 may be attached to the bottom portion 112 with alignment rods 130. The alignment rods 130 may each be inserted in a complementing hole 132. The alignment rods 130 may extend downward from the top portion 110 or upward from the bottom portion 112. For example, the alignment rods 130 may extend from a bottom surface 134 of the top portion 110 or a top surface 136 of the bottom portion 112. The holes 132 may be on the top portion 110 or the bottom portion 112. For example, the holes 132 may be on the bottom surface 134 or the top surface 136. In some embodiments, there may be more than two alignment rods 130. The alignment rods 130 may be locked into place once inside their respective holes 132. For example, a lock resembling that of a headrest being locked onto a vehicle seat at a desired height may be utilized. In another example, a key may be engaged with a key hole 138 and turned to engage a lock to lock the alignment rods 130. Once locked, the top portion 110 may be secured to the bottom portion 112 and be in a fixed position. In other examples, the top portion 110 may be attached to the bottom portion 112 with clips, press-fit, hooks, and/or the like.

Figure 4C:
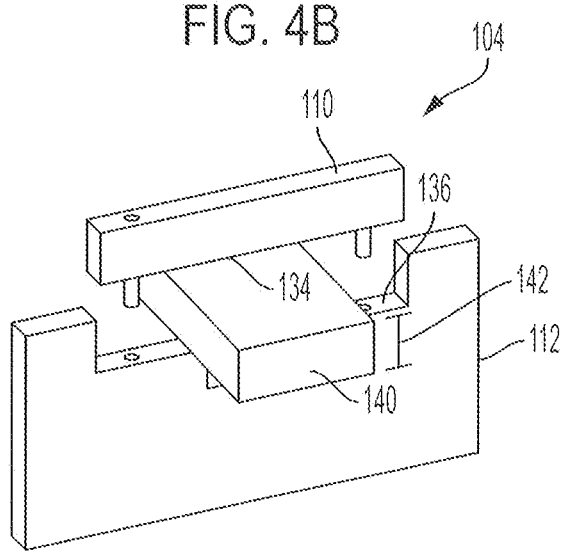
FIG. 4C illustrates an isolated view of the cargo stabilizing tailgate of FIG. 3A with secured cargo according to an aspect of the present disclosure.

FIG. 4C illustrates an isolated view of the cargo stabilizing tailgate 104 with secured cargo according to an aspect of the present disclosure. The top portion 110 and the bottom portion 112 may fit a cargo 140 having a height 142 between 0.5 inches (in) to 32 in. Preferably, the height may be between 1 in to 24 in. Most preferably, the height may be between 1 in to 16 in. Initially, the cargo 140 may be placed or leaned on the top surface 136 of the bottom portion 112. Then, the top portion 110 may be lowered onto the cargo 140. The alignment rods 130 may be long enough to fit into the holes 132 to accommodate the cargo 140. Once the top portion 110 and the bottom portion 112 sandwich the cargo 140, the top portion 110 may be locked to prevent movement with respect to the bottom portion 112. In some embodiments, the bottom portion 112 may be locked to prevent movement with respect to the top portion 110. The locking mechanisms described in discussing FIG. 4B may be utilized. The top surface 136 and/or the bottom surface 134 of the top portion 110 may be lined with foam, rubber, and/or other plastic material to grip the cargo 140 as well as mitigate damage to both the cargo 140 and the tailgate 104.

Figure 5A:
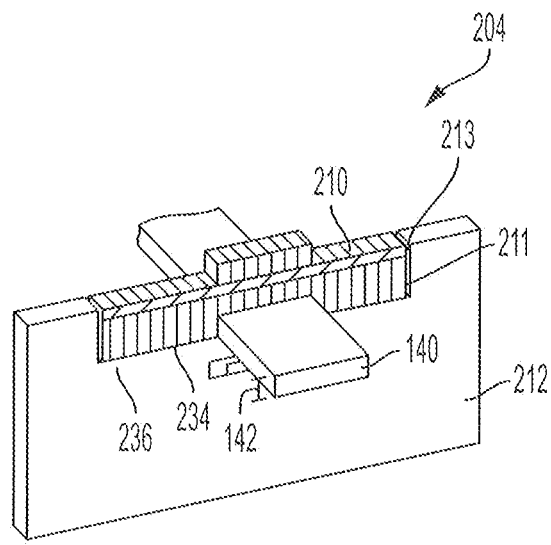
FIG. 5A illustrates an isolated view of a cargo stabilizing tailgate having a top portion that is configured to function as a contour gauge according to an aspect of the present disclosure.

FIG. 5A illustrates an isolated view of a cargo stabilizing tailgate 204 having a top portion 210 that is configured to function as a contour gauge according to an aspect of the present disclosure. The top portion 210 may have a plurality of fingers 211. The fingers 211 may be made from plastic, metal, wood, and/or glass. By example, the fingers 211 may be formed in the shape of a cylindrical, a rectangular, or a triangular prism. Each finger 211 may have a width 217 (see FIG. 5B) of between 0.1 in to 1 in. Preferably, the width 217 may be between 0.25 in to 0.75 in. The fingers 211 may be bundled and held together by an outer insert 213 surrounding the fingers 211 exteriorly. The fingers 211 may be lined up in one or two directions. For example, the fingers 211 may be adjacent to each other horizontally. In another example, the fingers 211 may be also adjacent to each other across the horizontal direction. The fingers 211 may move up and down within the outer insert 213. The fingers 211 may move up to adapt to the shape of the cargo 140 and contour the cargo 140 when the top portion 210 and the bottom portion 212 sandwich the cargo 140. The fingers 211 may sit on the cargo 140 entirely or partially based on the dimensions of the cargo 140 and the fingers 211. Each finger 211 may be independently moved and adjusted. The fingers 211 advantageously allow for a variable, adjustable securing cargo system that can easily adapt to changing sizes and shapes of cargo 140.

The top portion 210 and the bottom portion 212 may fit a cargo 140 having a height 142 between 0.5 inches (in) to 32 in. Preferably, the height may be between 1 in to 24 in. Most preferably, the height may be between 1 in to 16 in. Initially, the cargo 140 may be placed or leaned on the top surface 236 of the bottom portion 212. Then, the top portion 210 may be lowered onto the cargo 140. Once the top portion 210 and the bottom portion 212 sandwich the cargo 140, the top portion 210 may be locked to prevent movement with respect to the bottom portion 212. The top surface 236 and/or the bottom surface 234 of the fingers 211 may be lined with foam, rubber, and/or other plastic material to grip the cargo 140 as well as mitigate damage to both the cargo 140 and the tailgate 204.

The top portion 210 may be attached to the bottom portion 212 with alignment rods being similar to the alignment rods 130 of FIGS. 4B-4C. The alignment rods may be fingers 211. In some embodiments, the alignment rods may be fixed between fingers 211. In some embodiments, the alignment rods may extend from the bottom surfaces 234 of the fingers 211. The alignment rods may each be inserted in a complementing hole. The alignment rods may extend from the top portion 210 or the bottom portion 212. For example, the alignment rods may extend from the bottom surface 234 of the top portion 210 or a top surface 236 of the bottom portion 212. The holes may be on the top portion 210 (e.g., empty space between fingers 211) or the bottom portion 212. For example, the holes 132 may be on the bottom surface 234. In some embodiments, there may be more than two alignment rods. The alignment rods may be locked into place once inside their respective holes. For example, a lock resembling that of a headrest being locked onto a vehicle seat at a desired height may be utilized. In another example, a key may be engaged With a key hole 238 (see FIG. 5B) and turned to engage a lock to lock the alignment rods. Once locked, the top portion 210 may be secured to the bottom portion 212 and be in a fixed position. In other examples, the top portion 210 may be attached to the bottom portion 212 with clips, press-fit, hooks, and/or the like. In some embodiments, the outer insert 213 may have extensions that engage with the bottom portion 212. For example, the extensions may slidably engage with sections of the bottom portion 212 surrounding the top portion 210 from the sides.

Figure 5B:
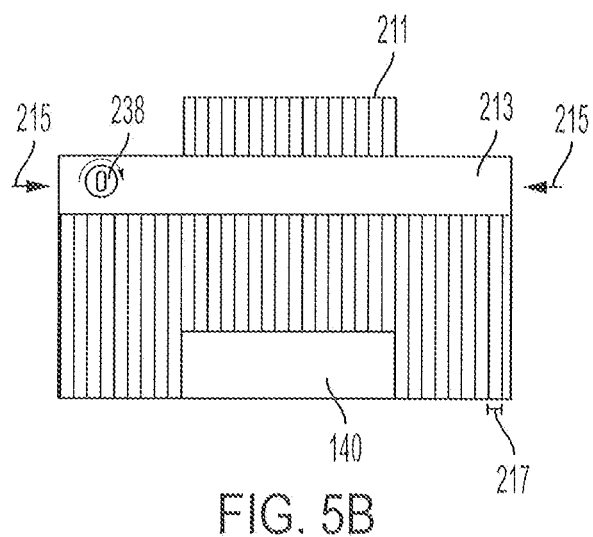
FIG. 5B illustrates an isolated view of the top portion of the cargo stabilizing tailgate of FIG. 5A according to an aspect of the present disclosure.

FIG. 5B illustrates an isolated view of the top portion 210 of the cargo stabilizing tailgate 204 according to an aspect of the present disclosure. The fingers 211 may be locked in place after adapting to the shape of the cargo 140 to prevent further movement of the fingers 211 during travel. The fingers 211 may be locked by tightening the grip of the outer insert 213 over the fingers 211. For example, the outer insert 213 may have an internal band along the perimeter of the outer insert 213 and the tension of the internal band may be increased to apply force on the fingers 211 from the sides as shown by arrows 215. For example, the key hole 238 may be turned (e.g., clockwise) to increase the tension of the internal band. Other conventional locking mechanisms utilized by contour gauges in the market may also be suitable.

Figure 6:
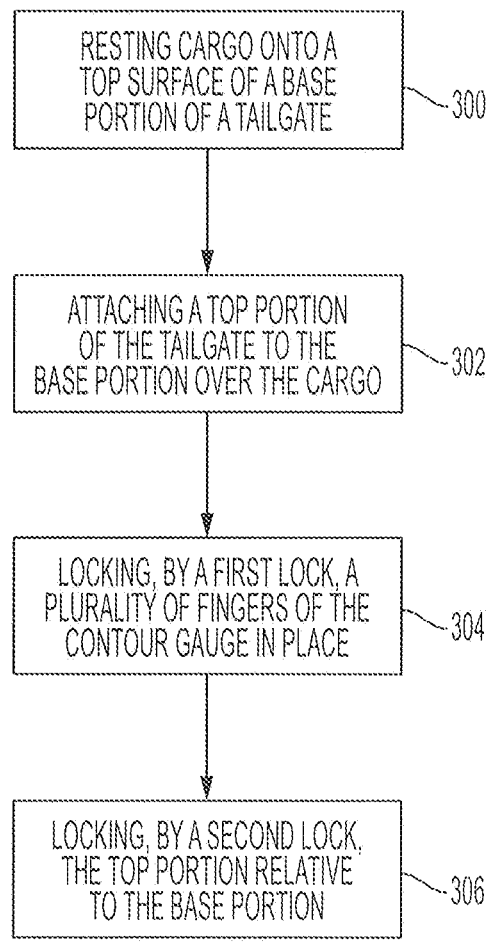
FIG. 6 is a block diagram illustrating steps of a method for securing cargo onto the vehicle of FIG. 1 according to an aspect of the present disclosure.

FIG. 6 is a block diagram illustrating steps of a method for securing cargo 140 (see FIGS. 4C-5A) onto a vehicle 100 (see FIG. 1) according to an aspect of the present disclosure. In block 300, the method may include resting cargo 140 onto a top surface 136, 236 of a bottom portion 112, 212 of a tailgate 104, 204. In block 302, the method may include attaching a top portion 110, 210 of the tailgate 104, 204 to the bottom portion 112, 212 over the cargo 140. When attached, the bottom surface 134, 234 of the top portion 110, 210 and the top surface 136, 236 of the bottom portion 112, 212 may hold the cargo in place. The bottom surface 234 may adapt to the shape of the cargo 140. The top portion 210 may function as a contour gauge. In block 304, the method may include locking, by a first lock, a plurality of fingers 211 of the top portion 210 in place. The first lock may be locked and unlocked via the key hole 238. In block 306, the method may include locking, by a second lock, the top portion 110, 210 relative to the bottom portion 112, 212. The second lock may be locked and unlocked via the key hole 138, 238.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle tailgate configured to secure cargo comprising:
 a base portion having a top surface, the base portion attachable to the vehicle;
 a top portion having a bottom surface and a plurality of fingers, the top portion attachable to the base portion, and the top surface and the bottom surface facing each other and configured to receive and fix the cargo when the top portion and the base portion are attached together; and
 a first lock configured to compress the plurality of fingers to lock the plurality of fingers in place.

2. The vehicle tailgate of claim 1, wherein the bottom surface is configured to adapt to a shape of the cargo.

3. The vehicle tailgate of claim 2, wherein the top portion is configured to function as a contour gauge.

4. The vehicle tailgate of claim 1, wherein the top portion is configured to be attached to the base portion by inserting one or more alignment rods extending from the bottom surface into one or more holes on the top surface.

5. The vehicle tailgate of claim 1, further comprising a second lock configured to lock the top portion relative to the base portion.

6. The vehicle tailgate of claim 1, wherein the top portion has left and right outer side surfaces and the base portion has left and right inner side surfaces, the left and right outer side surfaces facing the left and right inner side surfaces when the top portion is attached to the base portion.

7. A vehicle configured to transport cargo in a secured state comprising:
 a tailgate comprising:
  a base portion having a top surface, the base portion attachable to the vehicle;
  a top portion having a bottom surface and a plurality of fingers, the top portion attachable to the base portion, and the top surface and the bottom surface facing each other and configured to receive and secure the cargo when the top portion and the base portion are attached together; and
  a first lock configured to compress the plurality of fingers to lock the plurality of fingers in place.

8. The vehicle of claim 7, wherein the bottom surface is configured to adapt to a shape of the cargo.

9. The vehicle of claim 8, wherein the top portion is configured to function as a contour gauge.

10. The vehicle of claim 7, wherein the top portion is configured to be attached to the base portion by inserting one or more alignment rods extending from the bottom surface into one or more holes on the top surface.

11. The vehicle of claim 7, wherein the tailgate further comprises a second lock configured to lock the top portion relative to the base portion.

12. The vehicle of claim 7, wherein the top portion has left and right outer side surfaces and the base portion has left and right inner side surfaces, the left and right outer side surfaces facing the left and right inner side surfaces when the top portion is attached to the base portion.

13. A method for securing cargo onto a vehicle comprising:
 resting the cargo onto a top surface of a base portion of a tailgate of the vehicle;
 attaching a top portion of the tailgate to the base portion over the cargo such that a bottom surface of the top portion and the top surface hold the cargo in place; and
 locking, by a first lock, a plurality of fingers of the top portion in place to prevent movement of the plurality of fingers when the vehicle is in motion.

14. The method of claim 13, wherein the bottom surface is configured to adapt to a shape of the cargo.

15. The method of claim 14, wherein the top portion is configured to function as a contour gauge.

16. The method of claim 13, wherein the top portion is attached to the base portion by inserting one or more alignment rods extending from the bottom surface into one or more holes on the top surface.

17. The method of claim 13, further comprising locking, by a second lock, the top portion relative to the base portion to further prevent movement of the cargo.

* * * * *